US010645100B1

(12) United States Patent
Wang et al.

(10) Patent No.: US 10,645,100 B1
(45) Date of Patent: May 5, 2020

(54) SYSTEMS AND METHODS FOR ATTACKER TEMPORAL BEHAVIOR FINGERPRINTING AND GROUPING WITH SPECTRUM INTERPRETATION AND DEEP LEARNING

(71) Applicant: Alert Logic, Inc., Houston, TX (US)

(72) Inventors: Dagen Wang, Houston, TX (US); Ian Rickey, Houston, TX (US)

(73) Assignee: Alert Logic, Inc., Houston, TX (US)

(*) Notice: Subject to any disclaimer, the term of this patent is extended or adjusted under 35 U.S.C. 154(b) by 213 days.

(21) Appl. No.: 15/819,341

(22) Filed: Nov. 21, 2017

Related U.S. Application Data

(60) Provisional application No. 62/424,964, filed on Nov. 21, 2016.

(51) Int. Cl.
  *G06F 12/14*  (2006.01)
  *H04L 9/32*  (2006.01)
  *H04L 29/06*  (2006.01)
  *G06N 3/08*  (2006.01)

(52) U.S. Cl.
  CPC ........... *H04L 63/1416* (2013.01); *G06N 3/08* (2013.01); *H04L 63/1433* (2013.01)

(58) Field of Classification Search
  CPC .... H04L 63/1416; H04L 63/1433; G06N 3/08
  USPC ..................... 726/23, 25; 713/168
  See application file for complete search history.

(56) References Cited

U.S. PATENT DOCUMENTS

| | | | | |
|---|---|---|---|---|
| 8,307,430 | B1* | 11/2012 | Chen ................. | H04L 63/1458 726/22 |
| 2006/0161984 | A1* | 7/2006 | Phillips ................ | G06F 21/564 726/24 |
| 2007/0025550 | A1* | 2/2007 | Saitoh ................ | G06F 21/6218 380/1 |
| 2010/0088259 | A1* | 4/2010 | Valpola ................. | G06N 3/08 706/14 |
| 2012/0291125 | A1* | 11/2012 | Maria ................. | H04L 63/1416 726/22 |
| 2014/0310394 | A1* | 10/2014 | Wood ..................... | H04L 43/04 709/224 |
| 2015/0128263 | A1* | 5/2015 | Raugas ............... | H04L 63/1408 726/23 |
| 2015/0135293 | A1* | 5/2015 | Mookiah .............. | H04W 12/12 726/7 |

(Continued)

*Primary Examiner* — Aravind K Moorthy
(74) *Attorney, Agent, or Firm* — Intrinsic Law Corp.

(57) ABSTRACT

Attackers may be uniquely identified by their temporal behavior patterns. Time marks and events in a time sequence between a unique pair of a source network address and a destination network address are pre-processed by a network security system to generate a temporal sequence for spectral extraction. The destination network address resides in a computer network monitored by the network security system. The temporal sequence is transformed from the time domain to the frequency domain to capture periodicity in the time sequence in a spectral vector. The spectral vector is denoised and decorrelated through deep learning to produce a spectral fingerprint that is significantly smaller than the spectral vector. The spectral fingerprint represents a temporal behavior fingerprint of an attacker associated with the source network address with respect to the destination network address over a period of time in the time sequence.

20 Claims, 7 Drawing Sheets

(56) References Cited

U.S. PATENT DOCUMENTS

| | | | |
|---|---|---|---|
| 2015/0248608 A1* | 9/2015 | Higgins | G06N 3/08 |
| | | | 706/16 |
| 2017/0293757 A1* | 10/2017 | Rosenman | G06F 21/552 |
| 2017/0359366 A1* | 12/2017 | Bushey | H04W 4/38 |
| 2018/0115566 A1* | 4/2018 | Azvine | H04L 63/0428 |
| 2018/0115567 A1* | 4/2018 | El-Moussa | H04L 63/1416 |
| 2018/0129900 A1* | 5/2018 | Kiraly | G06F 19/321 |
| 2018/0276542 A1* | 9/2018 | Cheng | G06Q 30/0241 |
| 2018/0351775 A1* | 12/2018 | Zhang | H04W 72/0413 |
| 2019/0124099 A1* | 4/2019 | Matselyukh | H04L 41/16 |

* cited by examiner

US 10,645,100 B1

SYSTEMS AND METHODS FOR ATTACKER TEMPORAL BEHAVIOR FINGERPRINTING AND GROUPING WITH SPECTRUM INTERPRETATION AND DEEP LEARNING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION(S)

This is a conversion of, and claims a benefit of priority from U.S. Provisional Application No. 62/424,964, filed Nov. 21, 2016, entitled "SYSTEMS AND METHODS FOR ATTACKER TEMPORAL BEHAVIOR FINGERPRINTING AND GROUPING WITH SPECTRUM INTERPRETATION AND DEEP LEARNING," the entire disclosure of which is incorporated by reference herein for all purposes. This application relates to U.S. patent application Ser. No. 15/819,357, filed Nov. 21, 2017, entitled "SYSTEMS AND METHODS FOR THREAT VISUALIZATION WITH SIGNATURE COMPOSURE, SPATIAL SCALE AND TEMPORAL EXPANSION," which is a conversion of, and claims a benefit of priority from U.S. Provisional Application No. 62/424,974, filed Nov. 21, 2016, entitled "SYSTEMS AND METHODS FOR THREAT VISUALIZATION WITH SIGNATURE COMPOSURE, SPATIAL SCALE AND TEMPORAL EXPANSION," both of which are incorporated by reference herein for all purposes.

TECHNICAL FIELD

This disclosure relates generally to network security. More particularly, embodiments disclosed herein relate to behavior modeling for network security systems operating in a distributed computing environment. Even more particularly, embodiments disclosed herein related to network security systems, methods, and computer program products for attacker temporal behavior fingerprinting and grouping with spectrum interpretation and deep learning.

BACKGROUND OF THE RELATED ART

In the field of network security, computerized tools are often used to prevent and monitor unauthorized access, misuse, modification, or denial of a computer network and network-accessible resources. A network intrusion detection system (NIDS) is an example of a computerized network security tool—which can be implemented as a networked device or software application—that monitors a network or systems for detecting malicious activity or policy violations. A network intrusion prevention system (NIPS) is another example of a computerized network security tool—which can be implemented as a networked device or software application—that aims to prevent such malicious activity or policy violations. These computerized network security tools are collectively referred to herein as network security systems.

Snort is an open source network security system that can, in different modes, read and display network packets on Internet Protocol (IP) networks (sniffing); log network packets (packet logging); and monitor and analyze network traffic (intrusion detection). Snort is known to those skilled in the network security art and thus is not further described herein for the sake of brevity.

A network security system such as Snort is generally programmed to detect certain events (referred to as Snort events) in a computer network and send out security alerts to human network security analysts. A human network security analyst may review Snort event data that triggered a security alert and determine whether or not to escalate to the management of the computer network under monitoring. Given the massive amounts of Snort event data that may come through a network security system at any given time, as well as the improbability for human network security analysts to catch all potential cyber attacks, there is room for innovations and improvement.

SUMMARY OF THE DISCLOSURE

When human network security analysts review Snort event data responsive to security alerts issued by, for instance, an intrusion detection system (IDS), they focus on the content in the Snort event data and rarely give any attention to temporal patterns that may exist in a Snort stream. Currently, there is no known solution to this problem. Recognizing that an attacker may have its own temporal behavior in sending out network traffic (e.g., some attacks seem to happen at around 7 PM every three to five days), an object of the invention is to model attacker behavior by fingerprinting its temporal behavior. In some embodiments, this object can be realized by collecting intervals of adjacent events and examining the distribution to identify Snort events with temporal patterns.

In some embodiments, an attacker temporal behavior fingerprinting method may comprise pre-processing a Snort temporal sequence between a unique source Internet Protocol (IP) address and a destination IP address to prepare data for spectral extraction, performing spectral extraction which generates a spectral vector, and transforming the spectral vector using deep learning (e.g., using a stacked auto-encoder) to denoise and decorrelate. The output spectral vector represents an attacker's unique temporal behavior pattern (fingerprint). Attacker temporal behavior patterns (fingerprints) thus generated can be further grouped, clustered, or otherwise analyzed to determine/predict attacker behavior for many useful network security applications.

More specifically, the method may include processing a time sequence containing event data, the time sequence associated with a unique pair of a source network address and a destination network address, the destination network address in a computer network monitored by the network security system, the processing resulting in a Fourier Transform-ready binned temporal sequence. The processing may further comprises determining a number of events occurring at each time mark of the time sequence and generating an initial temporal sequence containing time marks of the time sequence, each time marks having a corresponding number of events. A binning function may be applied to the initial temporal sequence. The binning function may set a plurality of time windows at a configurable time interval and operate to count a number of events in each time window, resulting in a binned temporal sequence. A time warping window can then be applied to the binned temporal sequence which results in the Fourier Transform-ready binned temporal sequence having an aggregation of time warping windows. The Fourier Transform-ready binned temporal sequence can be transformed from the time domain to the frequency domain to capture periodicity in the time sequence in a spectral vector having a machine-digestible vector size of 1024. This spectral vector can then be denoised and decorrelated by a machine learning module which implements a particular deep learning technique to generate a denoised and decorrelated spectral vector having a machine-digestible vector size of 10. The machine-digestible output from the machine learning module represents a temporal behavior fingerprint of an attacker associated with the source network address with respect to the destination network address over a period of time.

One embodiment comprises a system comprising at least one processor and at least one non-transitory computer-readable storage medium that stores computer instructions translatable by the at least one processor to perform a method substantially as described herein. Another embodiment comprises a computer program product having at least one non-transitory computer-readable storage medium that stores computer instructions translatable by at least one processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions and/or rearrangements may be made within the scope of the disclosure without departing from the spirit thereof, and the disclosure includes all such substitutions, modifications, additions and/or rearrangements.

BRIEF DESCRIPTION OF THE DRAWINGS

A more complete understanding of the invention and the advantages thereof may be acquired by referring to the following description, taken in conjunction with the accompanying drawings in which like reference numbers indicate like features and wherein.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
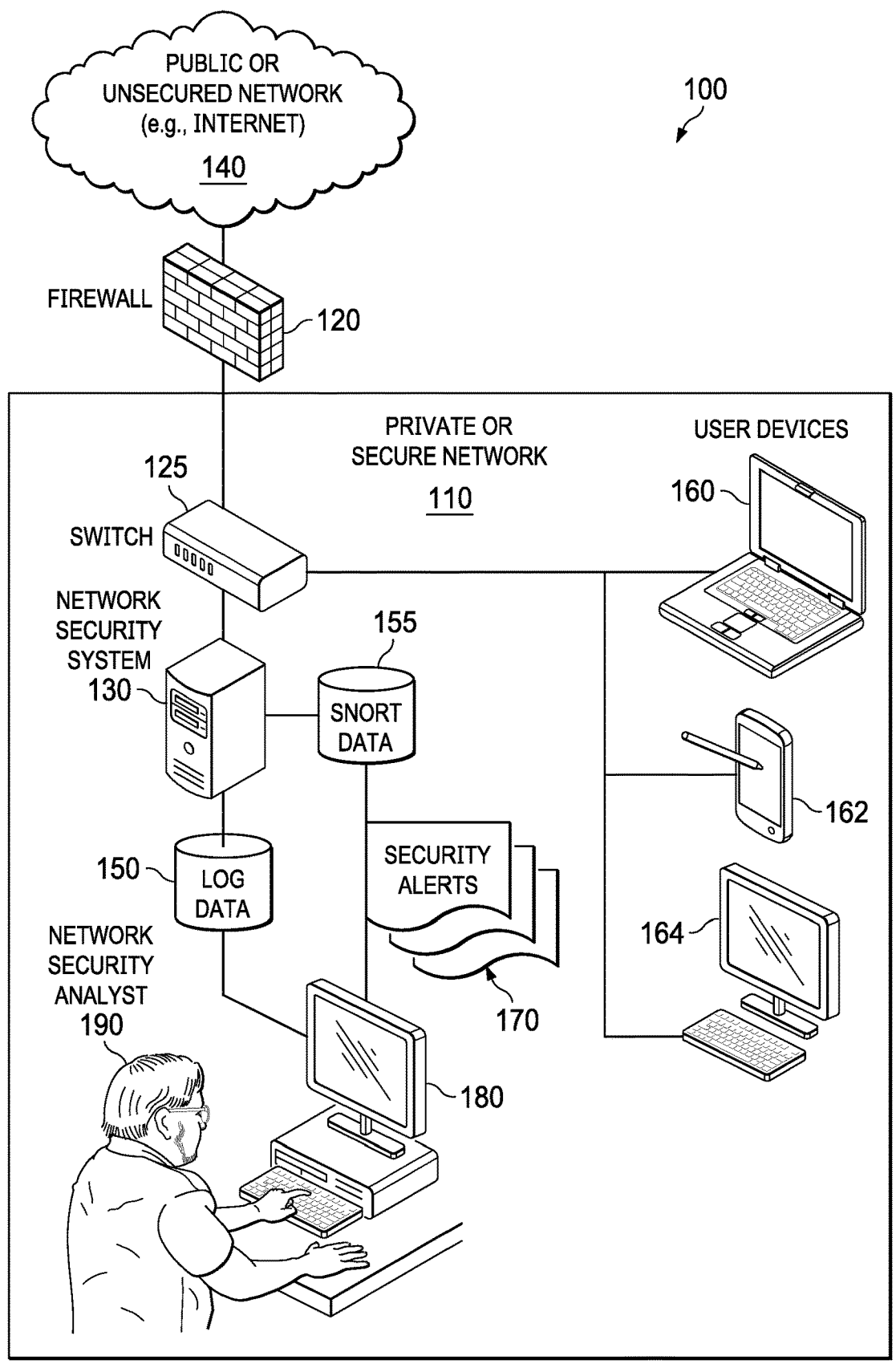
FIG. 1 depicts a diagrammatic representation of an example of a network security system operating in a network computing environment where embodiments disclosed here can be implemented.

FIG. 1 depicts a diagrammatic representation of one example of network security system 130 operating in private or secure network 110 that communicates with public or unsecured network (e.g., the Internet) 140 through firewall 120 in network computing environment 100. Network security system 130 may be communicatively connected to switch 125 behind firewall 120 to monitor network traffic to and from private network 110. As a non-limiting example, network security system 130 may be a Snort-based system as described above. Snort events in Snort data 155 can carry some security information/warnings (e.g., security alerts) 170. However, not all security alerts 170 may cause damage to assets 160 (e.g., server machine(s) 130, user devices 162, 164, 180, storage devices storing log data 150, Snort data 155, network device 125, software running on server machine(s) 130, and/or data 170) owned by an operator of private network 110. Accordingly, human network security analyst 190 may review security alerts 170, identify a true incident from the Snort events contained therein, and then escalate or report the true incident (e.g., to the operator of private network 110).

Since activities on a network can be collected in log messages, log data can provide the needed security context. However, to human network security analysts, this security context is lost or not possible to extrapolate. One reason is that log messages are unstructured. Moreover, networked computer systems may collect log messages for various reasons other than network security. For example, they may collect log messages for compliance reasons and no human review may be conducted on the collected log messages. Furthermore, log messages may have different time bases, data formats, data schemas, etc. and may be recorded asynchronously. Thus, it can be practically impossible for human network security analysts to try to differentiate, out of hundreds of millions of log messages between Internet Protocol (IP) or network addresses, activities that may reflect normal events being logged from activities that may be more malicious in nature, for instance, that may correlate to some kind of attack techniques. Unfortunately, because log messages are not considered as a data source for identifying possible attacks, no tools existing today that may indeed correlate collected (logged) events in log messages to provide the proper security context to IDS attacks identified by the IDSs.

Figure 2:
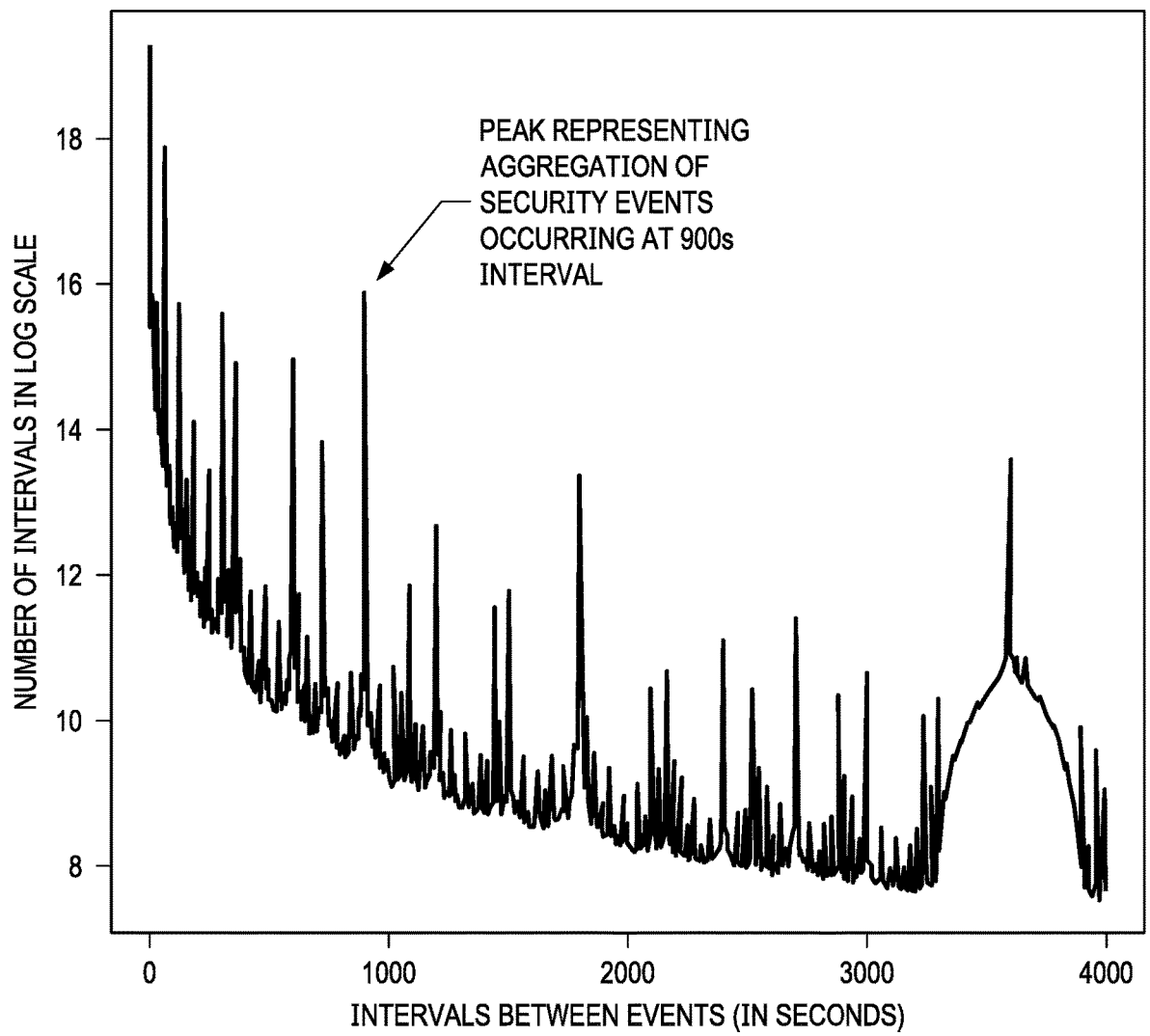
FIG. 2 depicts a plot diagram showing an example of a time sequence interval distribution of network activities.

FIG. 2 depicts a plot diagram showing an example of a snort event time sequence interval distributions of network activities revealing the existence of peaks occurring on varying time intervals. Some peaks can be explained by some system activities and some peaks are actually hacker/attacker activities that are obfuscated in some way to make them virtually undetectable by an IDS. Even though they may be obfuscated, such attacker activities behave in some kind of temporal pattern (e.g., repeat itself in several hours, over and over again, with noises in between activities). That is, a hacker or attacker may apply the same tool/routines to attack a network asset, a network device, a web site, or a computer network over time and may do the same to other web sites and/or computer networks.

To show the existence of periodicity in attack time sequences, here is an illustrative example explaining the generation of FIG. 2. Embodiments disclosed herein examine a big number of attacks by counting the number of adjacent event intervals in all the time sequence and record the relationship between such event interval counts (in log scale) to event interval (in seconds). FIG. 2 illustrates such a relationship. The peaks are indicating the event intervals that occurs significantly more than their neighbors.

As illustrated in the statistical distribution of FIG. 2, such attacker behaviors can be considered time-based with some periodicity (regular recurrences), although they may not be precisely periodical. By identifying the specific periodicity composition in a time domain diagram (FIG. 2), an attacker's temporal behavior pattern may also be identified. While FIG. 2 explains the problem space in an aggregated nature in detecting attacker activities, it does not reveal any individual attacks and thus is not used by human security specialists to study individual attacks. Further, temporal patterns rarely got presented to human security specialists as they do not review temporal sequences or time domain diagrams. Rather, they review the content of attacker activities. Thus, FIG. 2 suggests a new way of machine-oriented reviewing of security events.

As further explained below with reference to a new network security system, in some embodiments, each time domain temporal sequence is associated with a unique source IP address (which could represent a potential attacker) and a destination IP address (which could represent a potential victim of the attacker) is pre-processed to an aggregation time period (e.g., a warping window). The periodicity in the time sequence, which may be caused by the automation of an attack, can then be transformed to extract a spectral vector. The spectral vector can again be transformed using deep learning (which de-noises and de-correlates the spectral vector) to extract a fingerprint that identifies the attacker's unique temporal behavior.

Figure 3:
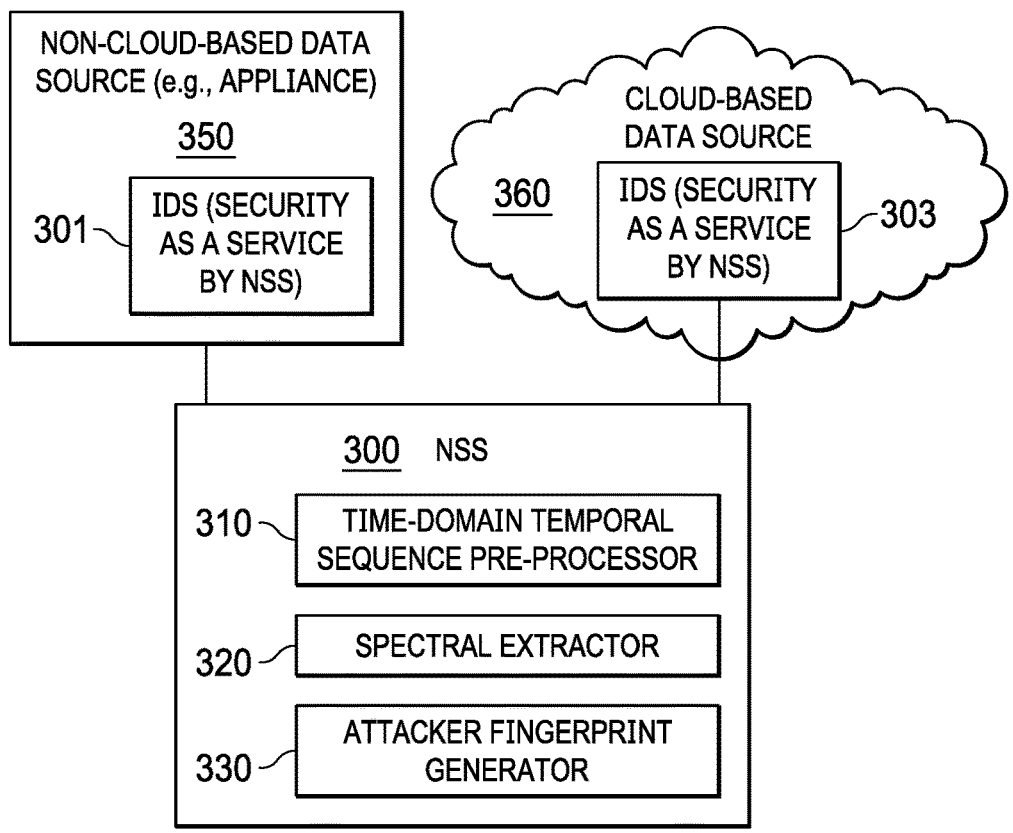
FIG. 3 depicts a diagrammatic representation of an example of a network security system providing intrusion detection services to cloud-based and non-cloud-based computing environments.

While FIG. 1 shows a network security system operating in a network computing environment that it monitors, other implementations are also possible. For instance, a network security system may reside outside of one or more network computing environments that it monitors. As illustrated in FIG. 3, network security system (NSS) server 300 (which can be executing on a server computer or multiple server machines) may operate to deliver intrusion detection service 301 to non-cloud-based computer 350 (e.g., an appliance installed on the premises of an enterprise) or intrusion detection service 303 to cloud-based computer 360 (e.g., a hosted server operating in a cloud computing environment).

As illustrated in FIG. 3, each IDS service provided by the NSS server can be configured to collect IDS event (raw) data from the respective computer network that it monitors and communicate the collected data to the NSS server as a Snort stream or sequence. A challenge faced by the NSS server and the like is that attackers may alter and/or evolve their attacking techniques and methods targeting different computer networks at different times. For example, the same attacker may use one software tool or method to attack one computer network and using another software tool or method to attack another computer network. Yet, most attackers utilize commonly available network exploitation (hacking) tools, such as an open source software tool like sqlmap, or their own scripts, such as a custom Python script. Sqlmap is an open source penetration testing tool that automates the process of detecting and exploiting several different types of SQL injection flaws and taking over of database servers. Python is a programming language. These and other network hacking tools and programming languages are known to those skilled in the network security art and thus are not further described herein.

One reason that attackers may feel comfortable in utilizing commonly available network hacking tools or custom scripts (collectively referred to herein as "tools") over and over again is that it is exhaustingly expensive for a network operator or owner to try to patch all potential network security vulnerabilities in view of all the possible attacks out there that are also constantly changing. A network security vulnerability, in this disclosure, may reflect a system susceptibility or flaw, attacker access to the flaw, and attacker capability to exploit the flaw. Indeed, the rate of evolution of an attacker's attack pattern and variables can be vastly faster than, and out paces an enterprise's ability to create and release a corresponding patch or patches. For example, a Trojan horse malware called Zeusbot or Zbot has existed since before July 2007 and still runs on versions of Microsoft Windows today. Using stealth techniques, Zeusbot is very good at hiding its tracks and, as such, is extremely difficult to detect even with up-to-date security software. Attacks by Zeusbot, SpyEye virus, and the like may be considered as significantly (e.g., 90%) unpreventable.

Because some network security vulnerabilities are extremely difficult to patch, they may be considered "unpatchable." It is not uncommon for attackers to try to take advantage of such "unpatchable" network security vulnerabilities using commonly available tools. Therefore, even though attackers may target different computer networks, there is a high likelihood that there may be similarities in the tools that they use and/or how they conduct the attacks using these tools. Some of these similarities may be too subtle and/or may elapse over a long period time that they become invisible to human network security analysts.

Historically, network security software or a security patch (i.e., a security update to the network security software) is content-based—examine network traffic content to find a known attack pattern (e.g., one that is known to attack a particular network security vulnerability). A drawback of this content-based approach is that attackers have many ways to evade detection and hide their tracks, leaving little trace behind.

To this end, embodiments disclosed herein take a different approach. Rather than trying to decipher the content in network traffic, embodiments of an intelligent network security system disclosed herein can learn the behavior of an attacker's tool (which could be automated) executing on a machine operating in a computer network monitored by the network security system over time, and the behavior of the machine when executing the tool, and transform the learned knowledge into a temporal behavior pattern that uniquely identifies an attacker. This process is referred to as attacker temporal behavior fingerprinting.

Spectral Transformation for Temporal Snort Sequence

Referring to the example shown in FIG. 3, in some embodiments, for any computer network monitored (e.g., through a network security service such as service 301 or service 303 shown in FIG. 3) by network security system ("NSS") 300, NSS 300 may include time-domain temporal sequence pre-processor 310 configured for applying special signal processing techniques to pre-process activities aggregated in a time sequence which could indicate a temporal behavior pattern of an attack between a source IP address and a destination IP address. NSS 300 may further include spectral extractor 320 for extracting a spectral vector and attacker fingerprint generator 330 for transforming the spectral vector into an attacker temporal behavior fingerprint (also referred to herein as a spectral fingerprint or an attacker fingerprint). Time-domain temporal sequence pre-processor 310, spectral extractor 320, and attacker fingerprint generator 330 will now be explained in detail below. In some embodiments, NSS 300 may utilize attacker temporal behavior fingerprints thus generated to perform attacks grouping for various purposes.

Figure 4:
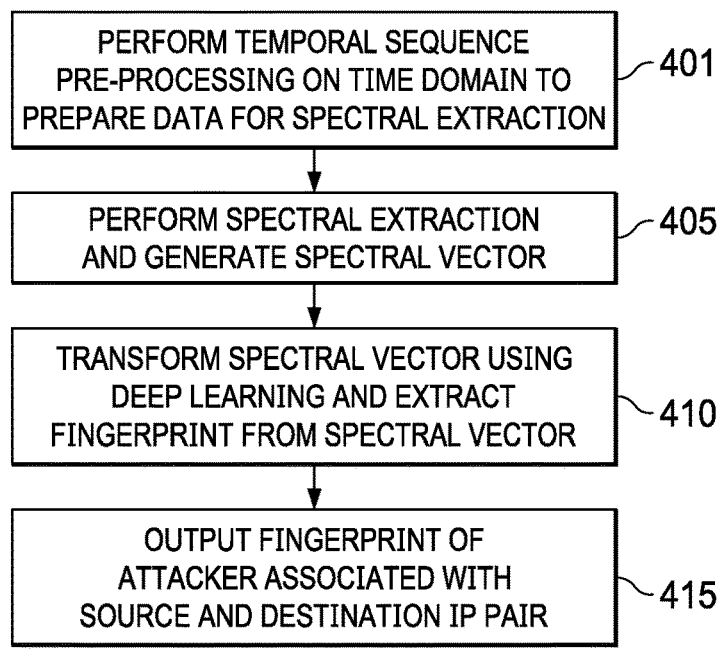
FIG. 4 depicts a flow diagram illustrating one example of an attacker temporal behavior fingerprinting method according to some embodiments disclosed herein.

In some embodiments, time-domain temporal sequence pre-processor 310 of NSS 300 may be particularly configured for pre-processing raw network traffic data (e.g., a time sequence of network activities) in preparation for spectral transformation by spectral extractor 320 to generate a spectral vector. Referring to FIG. 4, in some embodiments, this pre-processing process (401) may comprise collecting a Snort sequence between a unique pair of a source IP address and a destination IP address.

In some embodiments, the collection may be done over a long time sequence (e.g., six months). In some embodiments, the pre-processing process may further comprise processing the collected Snort sequence into internal representations (internal to NSS 300) referred to as NSS packets. Specifically, the processing may entail keeping only the time marks relative to events in the Snort sequence.

As an example, this may result in the following initial temporal sequence:

$$s(0), s(1), \ldots, s(t)$$

where t refers to time on the millisecond (ms) scale. Each s(t) represents the number of NSS packet at time t.

For the time point that no Snort event is triggered, the corresponding s(t) is zero. For the time point with multiple events, s(t) is the sum of those events. For example:

| Time s(t): | # number of events (on each time) |
|---|---|
| 0 | 1 |
| 1 | 0 |
| 2 | 9 |
| 3 | 4 events fired |

If no event is fired, s(t)=0. When at least one event is fired, s(t) is the # of events. That is, if any event is fired at a time point t, then s(t) represents whatever the number of events fired at that time point.

In some embodiments, time-domain temporal sequence pre-processor 310 may next apply a binning function to the initial temporal sequence, setting the bins (which represent windows in time) at 100 ms, for instance. Other time scales for this temporal aggregation can also be used, depending upon the granularity desired. In some embodiments, time-domain temporal sequence pre-processor 310 may then sum all events in each time window (bin). This results in the following binned temporal sequence:

$$sb(0), b(1) \ldots sb(i)$$

where subscript i refers to the index of the time window. Each sb(i) represents the number of NSS packet of time index i (in 100 ms).

Note that while "s" refers to "sequence" and "sb" refers to "sequence bin" in this example, other variable names may also be used for the time windows. Thus, these variable names are meant to be non-limiting examples.

In some embodiments, time-domain temporal sequence pre-processor 310 may then apply a time warping window (WB) to the binned temporal sequence where WB=2^24 (16777216), essentially selecting a specific period of time (which, in this non-limiting example, is a little over 19 days) for further analysis. Other WB values may also be possible. For events captured beyond this window of time, they can be warped into this window by performing an operation as follows:

$$sbf(i)=sb(i)+sb(i+WB)+sb(i+2WB)$$

This results in a Fourier Transform-ready binned temporal sequence (sbf) having an aggregation of time warping windows (e.g., from day 0 to day 19, day 19 to day 38, etc.).

Once the internal data (in this case, a Fourier Transform-ready binned temporal sequence) is prepared, spectral transformation is performed to extract a spectral vector (405). In performing spectral transformation, in some embodiments, spectral extractor 320 may output F(I) by applying Fourier Transform to the Fourier Transform-ready binned temporal sequence (sbf) with a time warping window (WB) as follows:

$$F(I)=\text{FourierTransform}(sbf)$$

Fourier Transform has been widely used in signal processing to capture periodicity in a temporal sequence. Fourier Transform decomposes a function of time into the frequencies that make it up (transforming from one domain to another, for instance, from the time domain to the frequency domain). It can transform the periodicity in a temporal sequence into spikes (peaks) in the spectral domain. However, Fourier Transform has not been known to be used in the network security field. Some embodiments of spectral extractor 320 disclosed herein may include a custom Discrete Fast Fourier Transform function particularly configured for computing the discrete Fourier Transform of the Fourier Transform-ready binned temporal sequence. Fast Fourier Transforms are known to those skilled in the art and thus are not further described herein.

Skilled artisans understand that this Fourier Transform output (F(I)) contains a subset collection of peaks at the frequencies that appear at the inverse of the peak intervals (see, e.g., FIG. 2). These are referred to as spectral components.

In some embodiments, spectral extractor 320 may further perform a spectral squared sum aggregation on F(I) with a window size (WA) to get an aggregated Fourier Transform output FA(I) where:

$$FA(I)=\text{sqrt}(|F(I*WA)|^2+|F(I*WA+1)|^2+ \ldots +|F(I*WA+WA-1)|^2)$$

The window size, in this case, represents a predetermined number of spectral components. As an example, WA=8192 spectral components. That is, in this example, spectral extractor 320 may aggregate about every set of 8K spectral components together and take a square root of the sum of sets of the spectral components. After performing sequence generation (which results in an initial temporal sequence s(t)), sequence binning (which results in a binned temporal sequence sb(i)), time warping (which results in a Fourier Transform-ready binned temporal sequence (sbf)), Fourier Transform (which results in a Fourier Transform output F(I)), and spectrum aggregation (which results in an aggregated Fourier Transform output FA(I)) on a very long time sequence, a spectral vector having a vector size of 1024 (i.e., each one-dimensional vector i of the multi-dimensional spectral vector has a 1024 floating point number) can be obtained (where FA(I) can be a mathematical representation of a spectral vector).

The spectral vector is transformed again (410) by attacker fingerprint generator 330 using a deep learning method to generate an attacker temporal behavior fingerprint for output (415). This is further described below. This output is specific to the unique pair of a source network address and a destination network address of the time sequence under examination.

Attacker Temporal Behavior Fingerprint Extraction

The spectral vector contains a huge amount of information (data points), some of which may not be indicative of an attacker's temporal behavior pattern. Thus, to extract a temporal pattern that may be uniquely identifying an attacker's temporal behavior with respect to a particular victim (which, in this case, is represented by the destination IP address), in some embodiments, the spectral vector is denoised and decorrelated. In some embodiments, to denoise and decorrelate the spectral vector so as to identify an attacker's temporal behavior with respect to a particular victim, attacker fingerprint generator 330 of NSS 300 may leverage a particular deep learning method.

Deep learning is a new field of machine learning which, in turn, is part of the field of artificial intelligence. Generally, deep learning is based on a set of algorithms that model high level abstractions in data by using a deep graph with multiple processing layers composed of linear and non-linear transformations. There are a number of deep learning architectures. Under each deep learning architecture, there are a huge number of variants. It is not always possible to compare the performance of multiple architectures all together, because they are not all evaluated on the same data sets and are used for vastly different purposes. For example, an intrusion detection system may use a specific large scale memory storage and retrieval neural network to learn patterns of normal and intrusive activities and then classify the observed system activities, while an image processing system may use stacked denoising autoencoders for image processing. None of the existing deep learning architectures, however, transform signals in the time domain into the frequency domain to capture the periodicity in a Snort sequence that may represent an attacker's temporal behavior pattern with respect to a particular destination IP address.

Referring to FIG. 4, in some embodiments, then, time-domain temporal sequence pre-processor 310 can process time marks and events in a time sequence (e.g., a Snort sequence) involving a particular source network address and a particular destination network address monitored by NSS 300 to generate input (e.g., a Fourier Transform-ready binned temporal sequence (sbf)) for spectral extractor 320 (401). In turn, spectral extractor 320 can transform the Fourier Transform-ready binned temporal sequence (which represents signals in the time domain) from the time domain to the frequency domain to capture the periodicity in the Snort sequence into a spectral vector that may represent an attacker's temporal behavior pattern with respect to a particular destination IP address (405). Once the periodicity is captured in the spectral vector as described above, the spectral vector is transformed again using deep learning (410). In some embodiments, attacker fingerprint generator 330 of NSS 300 may leverage a stacked autoencoder to denoise and decorrelate the spectral vector. Stacked autoencoders are known to those skilled in the art and thus are not further described herein.

In some embodiments, attacker fingerprint generator 330 of NSS 300 may further comprise a deep learning engine or module particular configured for performing deep learning utilizing a stacked autoencoder. The deep learning module may operate to train the stacked autoencoder with particular parameters. In some embodiments, the stacked autoencoder is trained by the deep learning module through a layer-wise back-propagation algorithm (which looks for the minimum of the mean squared reconstruction error) with a machine learning library (e.g., Pylearn2, TensorFlow, Deeplearning4j, etc.).

As a non-limiting example, key parameters for training a stacked autoencoder may include the following:
Activation function: tanh (a known non-linear function)
Learning rate: 1e-3
Costs: Mean squared reconstruction error
Exponential decay factor: 1.000001
Minimum learning rate: 0.000001

Figure 5:
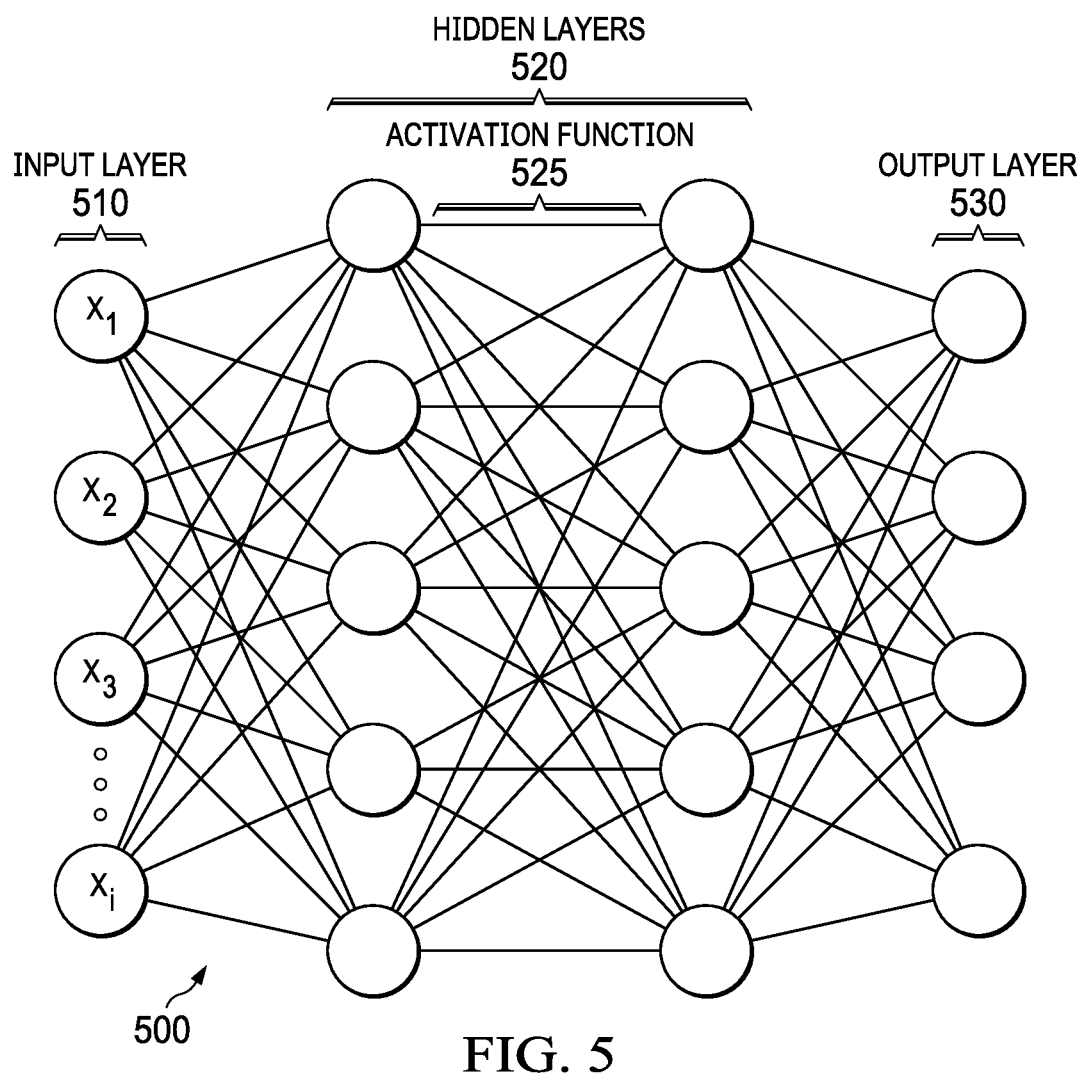
FIG. 5 depicts a diagrammatic representation of an example of a deep learning neural network with hidden layers between an input layer and an output layer.

FIG. 5 depicts a diagrammatic representation of an example of deep learning neural network 500 with hidden layers 520 between input layer 510 and output layer 530. As illustrated in FIG. 5, the spectral vector X (which, in the example above, is the vector represented by FA(I) as discussed above) may be represented in the input layer of a stacked autoencoder where the $i^{th}$ element is $X_i$ (or FA(i) in the example above). Following the above example, the spectral layer has a size of 1024. Thus, the input layer has a size of 1024. In this example, there can be two hidden layers, each layer having a size of 600 (600 units). Nodes from the input layer are fully connected to all 600 nodes at the first hidden layer. The autoencoders are trained layer-by-layer. The tanh activation function (e.g., activation function 525) can be particularly selected to capture the internal representations from the outputs from the first hidden layer and provide same to the second hidden layer. Autoencoders can be trained on the second hidden layer and generate outputs in the output layer. The resulting output layer, in the example, has a vector size of 10 (10 floating point numbers). A skilled artisan understands how to train stacked autoencoders using the particulars (including the particular non-linear function and key parameters) disclosed herein and achieve the same result described above.

A spectral vector thus denoised and decorrelated by the stacked autoencoder is referred to as a fingerprint vector or a spectral fingerprint. In this example, the spectral fingerprint has a vector size of 10. The 10 floating point numbers represent a unique mathematical description of a temporal Snort event sequence (i.e., the 10 floating point numbers are a 10-dimensional representation with a strong distinguishing capability as a fingerprint). Such a numeric vector is not meant for human to interpret or understand. It is a machine-digestible vector for differentiating different attack patterns. Its usage can be illustrated by examples below, for instance, campaign grouping.

Each spectral fingerprint represents a unique attacker temporal behavior pattern (and hence is also referred to as an attacker fingerprint or an attacker's temporal behavior fingerprint) representing a particular "conversation" (which may include different attacks) between a particular source IP address and a particular destination IP address over a period of time. Because multi-dimensional representations are difficult for human network security analysts to visualize, special visualization processing techniques may be needed to present spectral fingerprints in a way that is user-friendly, efficient, and effective in providing security insight to human network security analysts. Examples of suitable visualization techniques can be found in the above-referenced U.S. patent application Ser. No. 15/819,357, filed Nov. 21, 2017, entitled "SYSTEMS AND METHODS FOR THREAT VISUALIZATION WITH SIGNATURE COMPOSURE, SPATIAL SCALE AND TEMPORAL EXPANSION," which is fully incorporated by reference herein.

Once an attacker is "fingerprinted" this way, they can be quickly and automatically identified by the NSS without the NSS having to process a huge volume of network traffic and/or Snort data. The speed of instruction detection using the spectral fingerprinting method described above can be particularly advantageous in stopping attacks where time is of essence—for example, stopping a malicious virus from stealing a credit card number, withdrawing money from a bank account, shutting down a critical function at a public utility facility, etc. Even if attacks targeting a particular destination network address (e.g., an IP address) had originated from different source network addresses (e.g., IP addresses), such attacks can be accurately traced back to the same attacker using their temporal behavior fingerprint, whether the identity of the attacker is actually known or not. The temporal behavior fingerprinting disclosed herein can thus be useful in proving that the same attacker is responsible for the attacks detected by the NSS.

Based on the temporal behavior fingerprinting model disclosed herein, more automation could be possible to enable an analyst work load reduction. For example, every future attack pattern (which can target a totally different victim) can be compared against this temporal behavior fingerprint. If an attack pattern matches the temporal behavior fingerprint, the analyst will surely know the type of attacks undergoing. Such a machine-automated modeling and prediction is helpful because while it may be possible for humans to recognize the same patterns, it is cost-prohibitive, time-consuming, inefficient, inconsistent, and possibly error-prone for human security analysts to do so manually. These drawbacks can be alleviated or eliminated by utilizing the temporal behavior fingerprinting technology described herein which leverages deep learning denoise and decorrelation to produce robust and reliable temporal behavior fingerprints. Note that at least due to pattern composition differences and mutations, without the temporal behavior fingerprinting technology disclosed herein, it can be extremely difficult, if not impossible, for conventional machines to automatically identify recurring attack patterns from network traffic.

Optional Example Application: Campaign Grouping Using Fingerprinting

Figure 6:
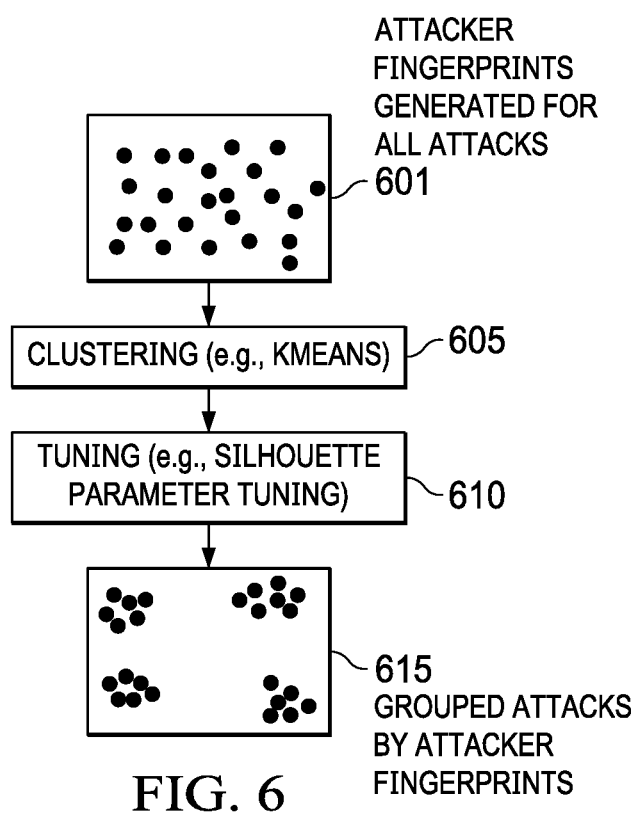
FIG. 6 depicts a flow diagram illustrating one example of a method for identifying attacker behaviors by grouping according to some embodiments disclosed herein.

FIG. 6 depicts a flow diagram illustrating one example of a method for identifying attackers using their temporal behavior fingerprints according to some embodiments disclosed herein.

Figure 7:
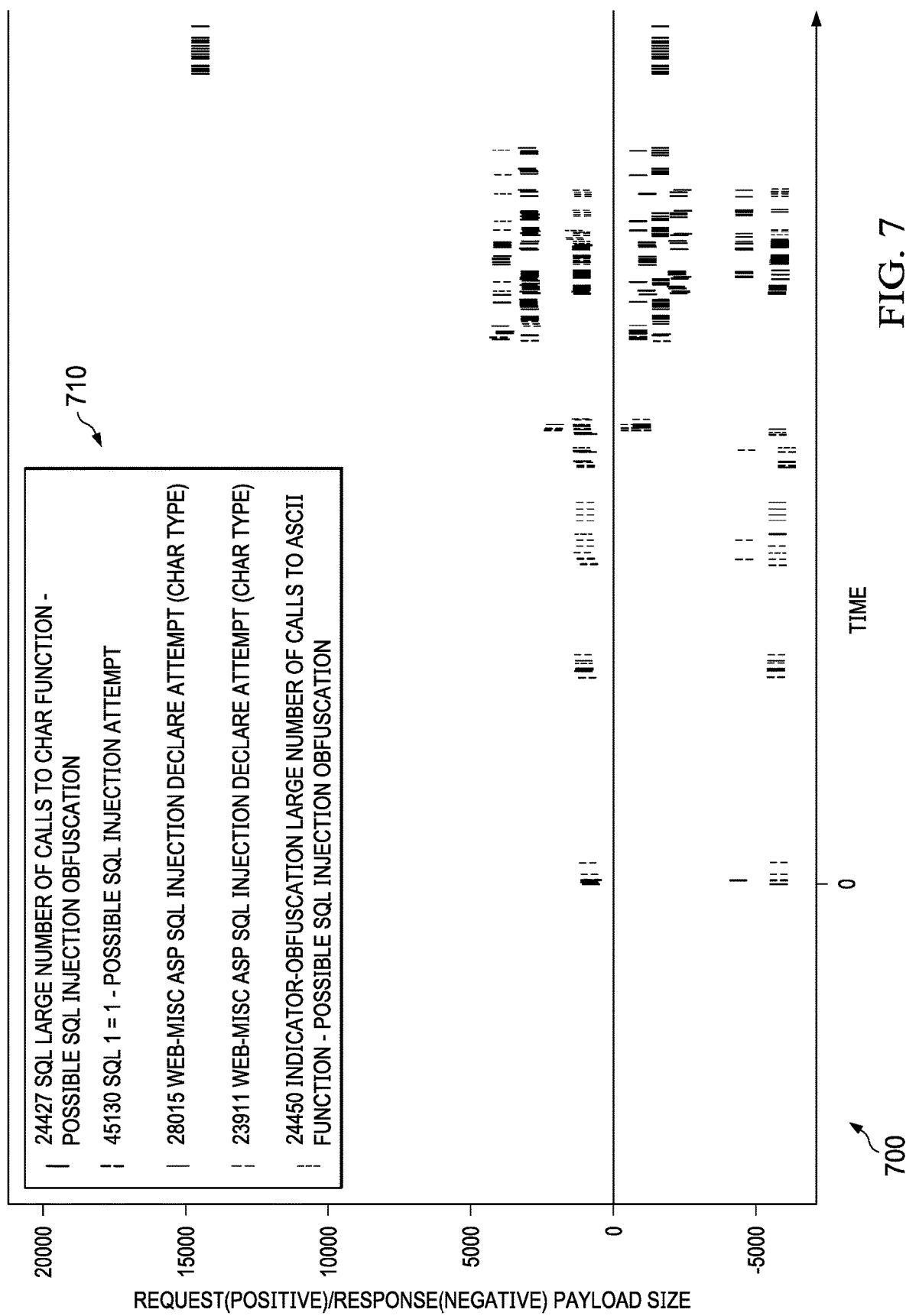
FIG. 7 depicts a plot diagram showing one example of attackers/attack patterns identified by respective temporal fingerprints over a timeline according to some embodiments disclosed herein.

Fingerprint vectors 601 thus generated as described above (each of which, as explained above, has a machine-digestible vector size of 10 floating point numbers representing an attacker's temporal behavior fingerprint) can be provided as input to a clustering method such as a k-means algorithm to obtain grouping of attacks per temporal behavior fingerprint (605). A Silhouette parameter tuning method (also referred to as Silhouette scoring) can be used (610) to fine-tune and determine the optimal number of groups (615). It has been shown that the solution described above is great at grouping similar attacks together—what are their purposes, what network vulnerabilities they try to exploit, etc. For example, it has been verified that the attack campaigns in the same group are the results of the same scanning tools used in the attacks. FIG. 7 depicts a non-limiting example of the ability of the NSS disclosed herein to capture different attackers/attack patterns and group them by respective temporal behavior fingerprints 710 over timeline 700. FIG. 7, which includes additional innovative visual effects such as payload size and signature type, is generated utilizing the unique threat visualization technology described in the above-referenced U.S. patent application Ser. No. 15/819,357, filed Nov. 21, 2017, entitled "SYSTEMS AND METHODS FOR THREAT VISUALIZATION WITH SIGNATURE COMPOSURE, SPATIAL SCALE AND TEMPORAL EXPANSION," which is fully incorporated by reference herein. Additional methods may also be utilized to present attackers/attack patterns and their temporal behavior fingerprints identified by the NSS disclosed herein.

Figure 8:
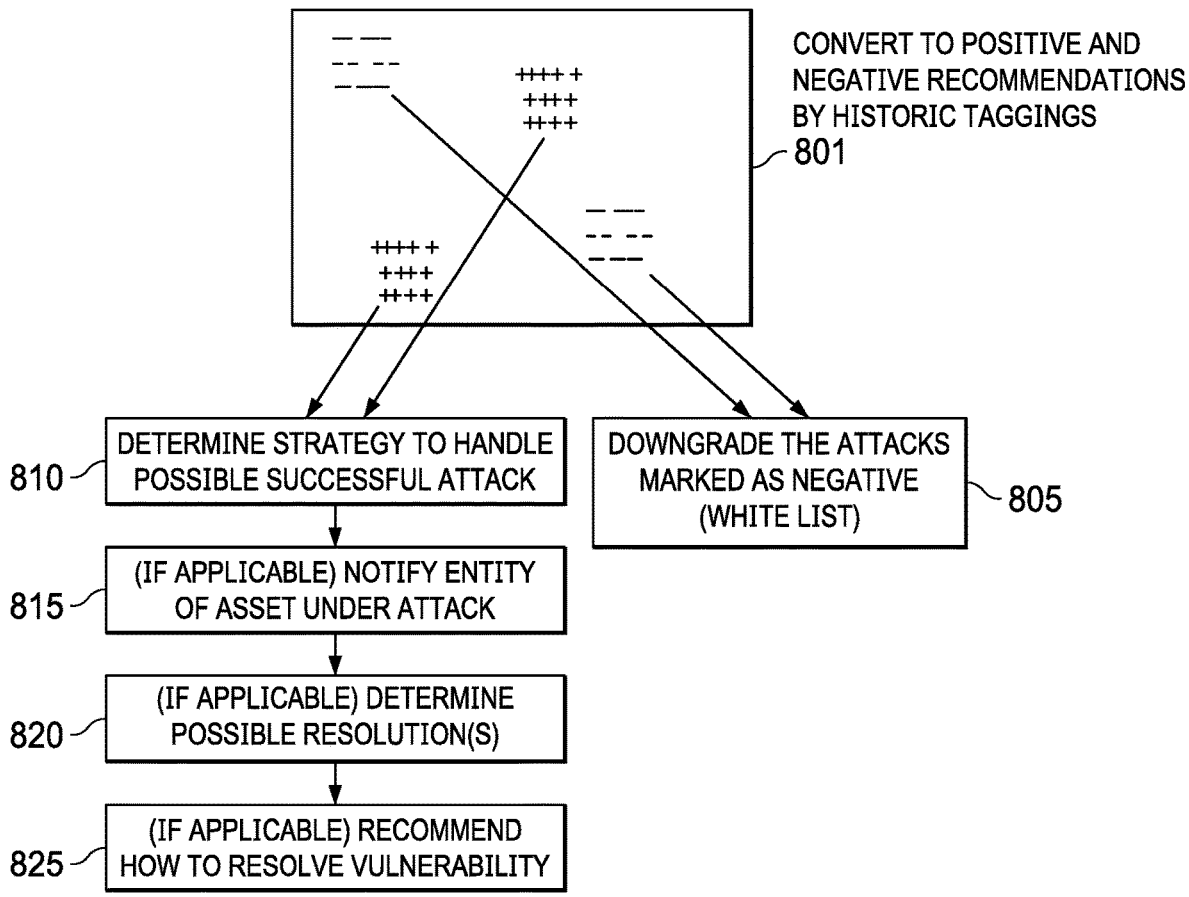
FIG. 8 depicts a flow diagram illustrating one example of a method for identifying different types of attacks and making appropriate recommendations according to some embodiments disclosed herein.

Grouping attacks this way can allow the NSS to notify the management of a computer network monitored by the NSS as to the various degrees of network vulnerabilities they face in view of these attack groups and their asset model, and make appropriate recommendations as to how to resolve (fix) those network security issues. FIG. 8 depicts a flow diagram illustrating one example of a method for identifying different types of attacks and making appropriate recommendations according to some embodiments disclosed herein. In some embodiments, temporal behavior fingerprints can be tagged once they are generated. For example, the NSS may generate and provide a network security specialist a temporal sequence diagram similar to FIG. 7 that allows them to review and analyze sequencing of events that are de-noised to specifically reveal successful attacks. As exemplified in FIG. 6, such attacks may be grouped by their temporal behavior patterns which reflect different attack phases, the nature or purpose of attacks (e.g., some attacks are largely to set up another type of attacks), etc. The network security specialist can quickly distinguish attacks from usual activities and tag each attack group accordingly, for instance, as "+" or "−" (801).

In some embodiments, attacks that are marked as negative or "−" are downgraded or whitelisted by the NSS (805) so that the NSS will recognize whitelisted attacks as usual activities the next time they occur on the computer network monitored by the NSS. Attacks that are marked as positive or "+" are used by the NSS in determining when the next successful attack(s) might be (810). As an example, suppose statistically based on attacker activities, the NSS knows that certain attacks may be 45% successful in a computer network (including the underlying network architecture). The NSS can make a prediction based on an attacker's behavior pattern as to when (at a future time T where T is the current time plus some time interval, see FIGS. 2 and 7) the next attack may be successful. The NSS may notify (815) the management or an operator of the computer network where the asset (e.g., a network address associated with a device, a web site, a server, a data store, software, hardware, etc.) resides. Such a notification may include various specifics about the attack(s), for instance, type(s) of attack, asset(s) involved, timing of upcoming attack(s), etc. Alternatively or additionally, the NSS may operate to determine possible resolutions (820) for protecting the asset(s) from such attacks (e.g., reconfiguring or rerouting the targeted network address, blocking access to the targeted network address(es), etc.) and make recommendation as to how to counter such attack(s) (825). A computer network monitored by the NSS may have whitelisted scans (e.g., system activities in their infrastructure), so this technology will also help distinguishing allowed behaviors/activities from malicious types of activities out of hundreds of thousands of temporal behavior fingerprints and millions and hundreds of millions of events, as exemplified in FIG. 7.

Figure 9:
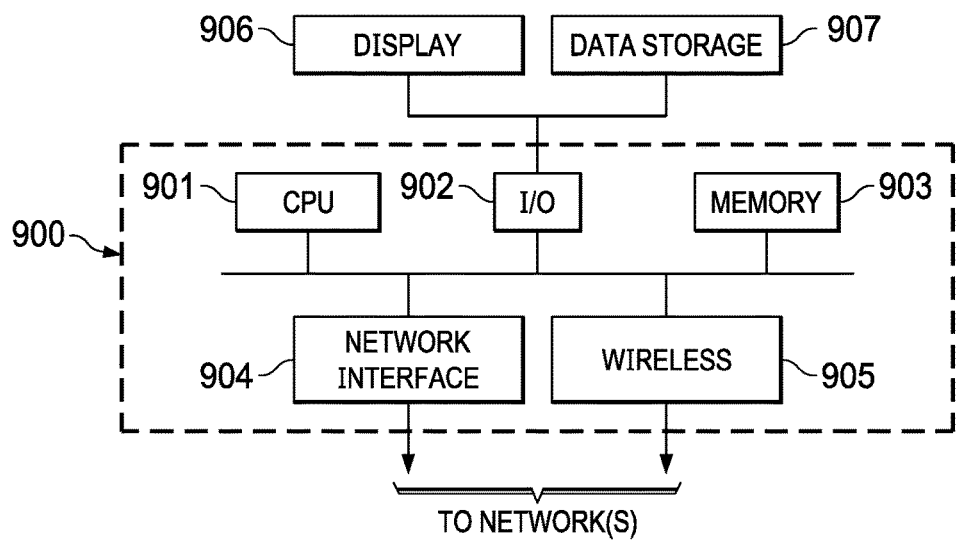
FIG. 9 depicts a diagrammatic representation of one example of a data processing system for implementing embodiments disclosed herein.

FIG. 9 depicts a diagrammatic representation of one example embodiment of a data processing system that can be used to implement embodiments disclosed herein. As shown in FIG. 9, data processing system 900 may include one or more central processing units (CPU) or processors 901 coupled to one or more user input/output (I/O) devices 902 and memory devices 903. Examples of I/O devices 902 may include, but are not limited to, keyboards, displays, monitors, touch screens, printers, electronic pointing devices such as mice, trackballs, styluses, touch pads, or the like. Examples of memory devices 903 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 900 can be coupled to display 906, information device 907 and various peripheral devices (not shown), such as printers, plotters, speakers, etc. through I/O devices 902. Data processing system 900 may also be coupled to external computers or other devices through network interface 904, wireless transceiver 905, or other means that is coupled to a network such as a local area network (LAN), wide area network (WAN), or the Internet. The servers and user devices described above may each be a data processing system that is the same as or similar to data processing system 900. Additionally, functional components necessary to implement embodiments disclosed herein may reside on one or more data processing systems that are the same as or similar to data processing system 900.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features, and functions in order to provide a person of ordinary skill in the art context to understand the invention without limiting the invention to any particularly described embodiment, feature, or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment," or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware, or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components and mechanisms may be used. The functions of the invention can be achieved in many ways. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. Accordingly, the scope of the invention should be determined by the following claims and their legal equivalents.

What is claimed is:

1. A computer-implemented method, comprising:
processing a time sequence containing event data, the processing performed by a network security system executing on a computer, the time sequence associated with a unique pair of a source network address and a destination network address, the destination network address in a computer network monitored by the network security system, the processing resulting in a Fourier Transform-ready binned temporal sequence;
wherein the processing further comprises:
determining a number of events occurring at each time mark of the time sequence and generating an initial temporal sequence containing time marks of the time sequence, each time mark having a corresponding number of events;
applying, by the network security system, a binning function to the initial temporal sequence, the binning function setting a plurality of time windows at a configurable time interval, counting a number of events in each time window, and producing a binned temporal sequence; and
applying a time warping window to the binned temporal sequence which results in the Fourier Transform-ready binned temporal sequence having an aggregation of time warping windows;
transforming, in the computer, the Fourier Transform-ready binned temporal sequence from a time domain to a frequency domain to capture periodicity in the time sequence in a spectral vector, the transforming performed by the network security system and including applying a Discrete Fast Fourier Transform function to the Fourier Transform-ready binned temporal sequence, the transforming resulting in the spectral vector, further spectral aggregation resulting in the spectral vector having a first machine-digestible vector size; and
denoising and decorrelating the spectral vector, in the computer, to generate a denoised and decorrelated spectral vector, the denoising and decorrelating performed by a deep learning module of the network security system, the denoised and decorrelated spectral vector having a second machine-digestible vector size representing a temporal behavior fingerprint of an attacker associated with the source network address with respect to the destination network address over a period of time in the time sequence.

2. The method according to claim 1, wherein the transforming further comprises:
applying, in the computer, a Discrete Fast Fourier Transform function to the Fourier Transform-ready binned temporal sequence which results in spectral components representing a collection of peaks in the time sequence at frequencies that appear at inverse of peak intervals; and
aggregating sets of spectral components, in the computer, by:
generating a sum of the sets of spectral components; and
taking a square root of the sum to produce the spectral vector.

3. The method according to claim 1, wherein the deep learning module of the network security system implements a layer-wise back-propagation algorithm for training stacked autoencoders, layer-by-layer, with parameters for an activation function, a learning rate, learning costs, an exponential decay factor, and a minimum learning rate.

4. The method according to claim 3, wherein the activation function is a non-linear function, wherein the learning costs relates to a mean squared reconstruction error, and wherein the stacked autoencoders are trained to generate the denoised and decorrelated spectral vector with a minimum of the mean squared reconstruction error.

5. The method according to claim 1, wherein the first machine-digestible vector size is 1024 floating point numbers and wherein the second machine-digestible vector size is 10 floating point numbers.

6. The method according to claim 1, further comprising:
clustering, in the computer, attacker temporal behavior fingerprints into groups of attacks;
tuning, in the computer, the groups of attacks so that similar attacks are grouped together; and
determining, in the computer, degrees of network vulnerabilities with respect to the groups of attacks.

7. The method according to claim 6, further comprising:
tagging, in the computer, each group of attacks as positive or negative;
downgrading, in the computer, positive attacks as whitelisted;
determining, in the computer, resolution options for resolving the network vulnerabilities with respect to negative attacks; and
generating, in the computer, recommendations based at least on the resolution options.

8. A network security system, comprising:
a processor;
a non-transitory computer-readable medium; and
stored instructions translatable by the processor to perform:
processing a time sequence containing event data, the time sequence associated with a unique pair of a source network address and a destination network address, the destination network address in a computer network monitored by the network security system, the processing resulting in a Fourier Transform-ready binned temporal sequence;
wherein the processing further comprises:
determining a number of events occurring at each time mark of the time sequence and generating an initial temporal sequence containing time marks of the time sequence, each time mark having a corresponding number of events;
applying, by the network security system, a binning function to the initial temporal sequence, the binning function setting a plurality of time windows at a configurable time interval, counting a number of events in each time window, and producing a binned temporal sequence; and
applying a time warping window to the binned temporal sequence which results in the Fourier Transform-ready binned temporal sequence having an aggregation of time warping windows;
transforming the Fourier Transform-ready binned temporal sequence from a time domain to a frequency domain to capture periodicity in the time sequence in a spectral vector, the transforming including applying a Discrete Fast Fourier Transform function to the Fourier Transform-ready binned temporal sequence, the transforming resulting in the spectral vector having a first machine-digestible vector size; and
denoising and decorrelating the spectral vector to generate a denoised and decorrelated spectral vector, the denoising and decorrelating performed by a deep learning module of the network security system, the denoised and decorrelated spectral vector having a second machine-digestible vector size representing a temporal behavior fingerprint of an attacker associated with the source network address with respect to the destination network address over a period of time in the time sequence.

9. The network security system of claim 8, wherein the transforming further comprises:
applying a Discrete Fast Fourier Transform function to the Fourier Transform-ready binned temporal sequence which results in spectral components representing a subset collection of peaks in the time sequence at frequencies that appear at inverse of peak intervals; and
aggregating sets of spectral components by:
generating a sum of the sets of spectral components; and
taking a square root of the sum to produce the spectral vector.

10. The network security system of claim 8, wherein the deep learning module of the network security system implements a layer-wise back-propagation algorithm for training stacked autoencoders, layer-by-layer, with parameters for an activation function, a learning rate, learning costs, an exponential decay factor, and a minimum learning rate.

11. The network security system of claim 10, wherein the activation function is a non-linear function, wherein the learning costs relates to a mean squared reconstruction error, and wherein the stacked autoencoders are trained to generate the denoised and decorrelated spectral vector with a minimum of the mean squared reconstruction error.

12. The network security system of claim 8, wherein the first machine-digestible vector size is 1024 floating point numbers and wherein the second machine-digestible vector size is 10 floating point numbers.

13. The network security system of claim 8, wherein the instructions are further translatable by the processor to perform:
clustering attacker temporal behavior fingerprints into groups of attacks;
tuning the groups of attacks so that similar attacks are grouped together; and
determining degrees of network vulnerabilities with respect to the groups of attacks.

14. The network security system of claim 13, wherein the instructions are further translatable by the processor to perform:
tagging each group of attacks as positive or negative;
downgrading positive attacks as whitelisted;
determining resolution options for resolving the network vulnerabilities with respect to negative attacks; and
generating recommendations based at least on the resolution options.

15. A computer program product comprising a non-transitory computer-readable medium storing instructions translatable by a processor of a network security system to perform:
processing a time sequence containing event data, the time sequence associated with a unique pair of a source network address and a destination network address, the destination network address in a computer network monitored by the network security system, the processing resulting in a Fourier Transform-ready binned temporal sequence;
wherein the processing further comprises:
determining a number of events occurring at each time mark of the time sequence and generating an initial temporal sequence containing time marks of the time sequence, each time mark having a corresponding number of events;
applying, by the network security system, a binning function to the initial temporal sequence, the binning function setting a plurality of time windows at a configurable time interval, counting a number of events in each time window, and producing a binned temporal sequence; and
applying a time warping window to the binned temporal sequence which results in the Fourier Transform-ready binned temporal sequence having an aggregation of time warping windows;
transforming the Fourier Transform-ready binned temporal sequence from a time domain to a frequency domain to capture periodicity in the time sequence in a spectral vector, the transforming including applying a Discrete Fast Fourier Transform function to the Fourier Transform-ready binned temporal sequence, the transforming resulting in the spectral vector having a first machine-digestible vector size; and
denoising and decorrelating the spectral vector to generate a denoised and decorrelated spectral vector, the denoising and decorrelating performed by a deep learning module of the network security system, the denoised and decorrelated spectral vector having a second machine-digestible vector size representing a temporal behavior fingerprint of an attacker associated with the source network address with respect to the destination network address over a period of time in the time sequence.

16. The computer program product of claim 15, wherein the transforming further comprises:
applying a Discrete Fast Fourier Transform function to the Fourier Transform-ready binned temporal sequence which results in spectral components representing a subset collection of peaks in the time sequence at frequencies that appear at inverse of peak intervals; and
aggregating sets of spectral components by:
generating a sum of the sets of spectral components; and
taking a square root of the sum to produce the spectral vector.

17. The computer program product of claim 15, wherein the deep learning module of the network security system implements a layer-wise back-propagation algorithm for training stacked autoencoders, layer-by-layer, with parameters for an activation function, a learning rate, learning costs, an exponential decay factor, and a minimum learning rate.

18. The computer program product of claim 17, wherein the activation function is a non-linear function, wherein the learning costs relates to a mean squared reconstruction error, and wherein the stacked autoencoders are trained to generate the denoised and decorrelated spectral vector with a minimum of the mean squared reconstruction error.

19. The computer program product of claim 15, wherein the instructions are further translatable by the processor to perform:
   clustering attacker temporal behavior fingerprints into groups of attacks;
   tuning the groups of attacks so that similar attacks are grouped together; and
   determining degrees of network vulnerabilities with respect to the groups of attacks.

20. The computer program product of claim 19, wherein the instructions are further translatable by the processor to perform:
   tagging each group of attacks as positive or negative;
   downgrading positive attacks as whitelisted;
   determining resolution options for resolving the network vulnerabilities with respect to negative attacks; and
generating recommendations based at least on the resolution options.

* * * * *